United States Patent [19]

Weil et al.

[11] Patent Number: 4,946,885

[45] Date of Patent: Aug. 7, 1990

[54] FLAME RETARDANT THERMOPLASTIC CONTAINING PHOSPHAM

[75] Inventors: Edward D. Weil, Hastings-on-Hudson; Navin G. Patel, Farmingdale, both of N.Y.

[73] Assignee: Stamicarbon B.V., Geleen, Netherlands

[21] Appl. No.: 405,320

[22] Filed: Sep. 11, 1989

[51] Int. Cl.$^5$ .......................... C08K 5/55; C08K 3/38; C08K 3/32

[52] U.S. Cl. .................................... 524/415; 524/100; 524/405

[58] Field of Search ................ 528/398; 524/100, 405, 524/415

[56] References Cited

U.S. PATENT DOCUMENTS

| | | | |
|---|---|---|---|
| 3,193,397 | 7/1965 | Stephens et al. | 528/398 |
| 3,193,571 | 7/1965 | Bilger | 252/608 |
| 3,332,905 | 7/1967 | Teter | 524/415 |
| 4,170,508 | 10/1979 | Wortmann et al. | 524/415 |
| 4,871,795 | 10/1989 | Pawar | 524/415 |

FOREIGN PATENT DOCUMENTS

| | | | |
|---|---|---|---|
| 2159431 | 6/1973 | Fed. Rep. of Germany. | |
| 1081245 | 12/1954 | France | 528/398 |
| 53-41400 | 4/1978 | Japan | 528/398 |
| 61-183383 | 8/1986 | Japan | 252/608 |

OTHER PUBLICATIONS

J. Chem. Socty–3233–3235, (1963), M. C. Miller & R. A. Shaw.

CA 76:94023d, (1972).

Kobayashi, Etsuro: Nippon Kagaku Kaishi 1, 38–43, (1972).

Eli M. Pearce et al., "Retardation of Combustion of Polyamides", *Flame Retardant Polymeric Materials*, (239–291), 1975.

*Primary Examiner*—Veronica P. Hoke
*Attorney, Agent, or Firm*—Cushman, Darby & Cushman

[57] ABSTRACT

A flame retardant thermoplastic containing an effective flame retardant amount of phospham. In additional embodiments, the thermoplastic has a processing temperature of above 200° C., and may include one or more polymers selected from the group consisting of styrene-containing polymers, polyolefins and polyamides.

18 Claims, No Drawings

FLAME RETARDANT THERMOPLASTIC CONTAINING PHOSPHAM

BACKGROUND OF THE INVENTION

This invention generally relates to flame retardant thermoplastics and in particular high-temperature-processed polymers containing a flame retardant amount of phospham.

The addition of halogenated compounds to retard the flammability of thermoplastics is known. Such halogen compounds, however, pose various problems such as corrosion, discoloration and release of acid gases upon incineration. They also cause environmental concerns in connection with disposal of used plastics and scrap.

It is further known to retard the flammability of polymers by employing various phosphorus and phosphorus-nitrogen compounds. For instance, red phosphorus has been employed but because of perceived hazards of the dust igniting and possible generation of toxic phosphine or white phosphorus, it has not achieved wide acceptance. Polymers processed at lower temperatures can have flame retardation by use of ammonium polyphosphate or organic phosphates. Polymers processed at higher temperatures, such as above about 200° C., however, are damaged by such additives, probably due to acid formation. It has been especially difficult to retard the flammability of nylon 4.6 which is processed above 300° C., because only a few aromatic halogen additives (which entail the problems mentioned above) have enough stability. It has not hitherto been possible to find a phosphorus-based flame retardant additive with enough stability or inertness towards the polyamide.

Various formulations making use of ammonium polyphosphate or phosphorus oxynitride have been proposed for the flame retardation of polymers, as for example by Nason and Nielsen, as described in U.S. Pat. No. 2,661,341 (1953). However, these phosphorus-oxygen-nitrogen-containing materials are subject to acid development under the high temperature conditions of processing, necessary for many thermoplastics, and also under conditions where electrical resistance is often of importance.

An object of the present invention is to solve the above discussed problems of conventional flame retardants by providing a flame retardant formulation for polymers, especially for polymers processed at above about 200° C., in particular styrene polymers, polyolefins and polyamides and more particularly, nylon 4.6 with no significant polymer degradation.

SUMMARY OF THE INVENTION

The compositions of the present invention comprise a thermoplastic polymer, particularly a thermoplastic polymer typically processed above about 200° C., more particularly polyamides, styrene polymers or polyolefins, and most particularly nylon 4.6; and a flame retardant amount of phospham.

Another embodiment of the present invention comprises the process of making the flame retardant polymer.

DETAILED DESCRIPTION OF THE INVENTION

Most broadly, the thermoplastics used in the flame retardant compositions of the invention, include a flame retardant amount of phospham. The thermoplastics encompass any polymer having a processing temperature of over 200° C. Such polymers include copolymers of styrene and α-methylstyrene for instance styrene-butadiene copolymers, styrene-acrylonitrile copolymers, and styrene-acrylonitrile-methyl methacrylate, graft copolymers of styrene, for instance the graft-polymerisate of styrene with acrylonitrile on polybutadiene (ABS) as well as mixtures of these polymers, single or double unsaturated hydrocarbons, for instance polyolefins such as polypropylene or copolymers and mixtures thereof and polyamides, i.e. polymers having a multiplicity of amide linkages, i.e. C—C(=O)—N—C linkages. Such polyamides thus, most broadly, encompass condensation polymers made, for instance, by polymarizing an ω-amino-acid or a lactam or by condensation polymerization of diamines or derivatives thereof (such as a diisocyanate) with dicarboxylic acids or derivatives thereof (such as a diester or dichloride). The polyamide in the composition can be a homopolyamide, a copolyamide or a mixture thereof. The polyamide can also be a copolymer by co-condensing polyamide forming compounds and for instance polyester and or polyimide forming compounds.

For polyamides, the present invention exhibits its best advantage in those polyamides or nylons which are processed at high temperatures, such as above about 200° C. Such polyamides include for instance nylon 6, nylon 6.6, nylon 11, nylon 12, nylon 4.4, nylon 4.6, nylon 6.3, nylon 6.4, nylon 6.10 and nylon 6.12 for example (these names being well known in the art, and defined for instance in the article on polyamides in the Encyclopedia of Polymer Science & Engineering, 2nd Edition), and nylon 6.I, 6.T, and MXD.6, in which I, T and MXD denote iso- and terephthalic acid group and metaxylylene diamine respectively.

Phospham is a known substance with the empirical formula $(PN_2H)x$, which is one member of the class of products which can be made by reaction of ammonia with phosphorus pentachloride, or alternatively by reaction of phosphorus (red) with ammonia. It was first prepared by Davy in 1811 and has an associated, extensive academic literature although it is not a common article of commerce. The chemistry and synthesis of phospham is reviewed by Miller and Shaw in the Journal of the Chemical Society, 1963, pp. 3233-3236, which is incorporated by reference. A convenient preparation of phospham from crude "phosphorus nitride diamide," (the ammonium chloride-contaminated mixture of aminophosphazines from phosphorus pentachloride and ammonia) is taught by Knapsack, Ger. Appl. 2159431 (published Jun. 7, 1973). In this process, the intermediate is heated for 3-15 hours at preferably 350°-380° C. to complete removal of $NH_3$.

A critical feature of phospham, which distinguishes it from various aminophosophazenes, (a number of which have been proposed as flame retardants for instance in Japanese Patent 61-183383), is that phospham is thermally stable above about 380° C. and does not give off a significant amounts of ammonia or other volatile substances until about 500° C. or even higher. The precursors of phospham, namely the aminophosphazenes, are not equivalents to phospham for use in the present invention. Although useful as flame retardant finishes for cotton, they lack the requisite stability for use in the present thermoplastics, for example nylons.

Phospham as a flame retarding component of polymers, is not suggested by the relevant literature nor conventional practices because it is an infusible ceramic-like substance and would not be expected to have chemical reactivity. It is also well known that extremely stable materials, even if they contain elements normally thought to be useful in flame retardants, are often very poor flame retardants, an example being antimony phosphate (ref. E. D. Weil, chapter 3 in "Flame Retardancy of Polymeric Materials," W. C. Kuryla and A. J. Papa, eds., Vol. 3, Marcel Dekker, N.Y., 1975, pp. 203–205).

In the present invention, the effective flame retardant amount of phospham is in the range of from about 0.1 to 25% by weight, and more preferably 0.2 to 15% by weight. Lower amounts are insufficient to pass any but the most lenient tests for flame retardation and higher amounts than 25% are uneconomical and have generally undesirable filler-like effects on physical properties of the thermoplastic.

Particularly advantageous formulations of the invention have also been found which contain an effective flame retardant amount of phospham together with at least one compound selected from the class consisting of char enhancers and drip suppressants. By char enhancers is meant additives which form char (carbonaceous matter) when subjected to flame exposure conditions in the presence of the polymer and phospham. Especially suitable char enhancers are, for example, polyhydric polynuclear phenols, for instance novolaks, and salts thereof with metals which form multiple charged cations, such as alkaline earths, zinc, aluminum and iron; or combinations or novolaks with relatively basic metal compounds which can form metal salts with the novolak under fire exposure temperatures, examples being the oxides, hydroxides, carbonates, phosphates, borates and silicates for magnesium, calcium, zinc, aluminium, iron, manganese, zirconium, tin and bismuth. Especially effective are boron oxide, the borates of metals having non-basic oxides (such as zinc, iron, aluminum, manganese, copper and lead) and melamine borate, and condensation products of boron oxide (or boric acid) with novolaks (i.e. borate esters of novolaks).

An effective amount of the char enhancing additives of the present invention is from about 0.2% to about 20% by weight, preferably from about 0.5% to about 15% by weight.

Other suitable char enhancers are cured phenolic resins (in finely divided particulate form), phenolic resins crosslinked or extended by epoxy resins, pentaerythritol, di- and tripentaerythritol benzoates, phosphates and phosphonates.

Drip suppressants are substances which retard the dripping of the polyamide during flaming, and in the context of the Underwriters Laboratory flammability test UL-94, they facilitate the avoidance of the flaming drip which, if it occurs, reduces the flame retardancy rating of a plastic. Suitable drip suppressants are finely divided infusible minerals or fluoropolymers, such as silica-containing minerals, calcium carbonate, calcium sulfate, barites, alumina, titania, iron oxide, or zironia, glass, or finely divided polytetrafluorethylene. Silicate minerals include silica itself ($SiO_2$), calcium silicate, calcium aluminosilicates, talc, mica, feldspar, kaolinite, kyanite, clays and shales.

The preparation of the compositions of the present invention can be performed using any of the mixing methods known in the polymer art for admixing an infusible particulate solid into a thermoplastic. Preblending can be performed using dry ingredients of the invention, or the mixing can be done in an extruder, a Banbury, or other sigma-bladed mixer. It is only necessary to distribute the phospham reasonably evenly throughout the thermoplastic polymer. It is helpful and advantageous for the phospham to be finely divided, for instance such as particulates below 40 microns in size, preferably below about 20 microns. For use in polyamides to be spun into fiber form, the particle size is advantageously below about 10 microns, and smaller particulates are often found advantageous.

The compositions of the invention can further contain stabilizers, pigments, reinforcing agents, processing aids, ultraviolet screening agents, other flame retardants, and other thermoplastics. Phospham-containing flame retardant blends and alloys with other thermoplastics are contemplated, provided that they contain a substantial amount, for instance above about 20%, of the thermoplastic typically processed above 200° C., for example, blends of polyamides with polycarbonates and polyesters.

To further illustrate the present invention the following examples are presented.

EXAMPLES

Nylon 4.6 (Stanyl®, a product of DSM, Netherlands) with relative viscosity $\eta_{rel}=3.4$ was admixed in the dry powder state with phospham and, for comparison, several related phosphorus compounds. The dry mixtures were first evaluated for stability by DSC analysis. DSC was performed with a heating rate of 20° C./minute starting from room temperature. Those which were adjudged stable enough were then extruded using a Maxwell screwless mini-extruder of Custom Scientific Instrument Corp., New Jersey, U.S.A. at about 310°–320° C. to make test specimens in the form of rods with approximate diameter of 3.2 mm. The extruder polymer was evaluated for stability by thermogravimetric analysis (heating rate 20° C./minute) and for flame retardancy by the Limiting Oxygen Index (LOI) method as described in ASTM D-2863. The results are shown in the following table.

| TGA DATA ON COMPOSITION OF NYLON 4.6 + ADDITIVE | | | | | | |
|---|---|---|---|---|---|---|
| Flame retardant | % (Wt) | % Wt. Loss at given temp. °C. 330° C.   370° C. | | 5% wt. Loss at °C. | 50% wt. Loss at °C. | Wt. % Residue at 750° C.  LOI % |
| Phospham[1] | 25 | −0 | ~0 | 390 | 416 | 37.4   28.8 |
| Phospham | 9 | LOI only run | | | | 28.8 |
| Phospham | 5 | LOI only run | | | | 28.8 |
| Phospham | 2 | LOI only run | | | | 26.9 |
| Phospham | 1 | LOI only run | | | | 26.2 |
| Phospham | 0.5 | LOI only run | | | | 25.6 |
| none | — | LOI with $SiO_2$ added to retard drip: | | | | 21.5 |
| $(NH_4PO_3)_x$[2] | 25 | 13.0 | 55.0 | 305 | 368 | 26.0   [4] |
| Phospham + | 10 + 5 | | | | | |

TGA DATA ON COMPOSITION OF NYLON 4.6 + ADDITIVE

| Flame retardant | % (Wt) | % Wt. Loss at given temp. °C. 330° C. | 370° C. | 5% wt. Loss at °C. | 50% wt. Loss at °C. | Wt. % Residue at 750° C. | LOI % |
|---|---|---|---|---|---|---|---|
| SiO$_2$ + novolak[3] | +10 | 0.4 | 1.9 | 395 | 420 | 26.1 | 30.6 |
| Phospham + novolak + ZB[5] | 0.5+ 10+ 5 | 0.36 | 2.77 | 376 | 430 | 17.6 | 31.3 |
| Phospham + novolak + ZP[5] | 0.5+ 10+ 5 | 0.73 | 0.77 | 395 | 440 | 9.0 | 27.1 |
| Phospham + novolak + B$_2$O$_3$ | 0.5+ 10+ 5 | 1.5 | 4.8 | 375 | 420 | 16.5 | 29.0 |
| Phospham + novolak + FeB[5] | 0.5+ 10+ 5 | 2.2 | 6.7 | 360 | 420 | 17.2 | 31.1 |

[1] Powdered product from heating polymeric diaminophosphazene and NH$_4$CL at 400° C. until substantially no further weight decline occurred.
[2] Encapsulated ammonium polyphosphate (powder) made by A&W Ltd. U.S.A.
[3] Silica is Siltex 32, a commercial silica powder made by Combustion Engineering Co., U.S.A., and novolak is a commercial resin HRJ2190 made by Schenectady Chemical Co., U.S.A.
[4] Sample was so extensively degraded by processing in the extruder that a meaningful LOI could not be run.
[5] Abbreviations: ZB = Zn$_2$B$_4$O$_{11}$; ZP = ZnP$_2$O$_8$; FeB = FeBO$_2$ The above data show high flame retardant effectiveness of phospham with minimal damage to the nylon 4.6. By comparison, the ammonium polyphosphate caused severe damage.

The formulation containing 10% phospham, 5% silica and 10% novolak was extruded in small rods that were supported vertically and ignited from the bottom by the air-methane flame under the conditions of the UL-94 flammability test. This formulation was found to self-extinguish in an average of 8.8 seconds with copious charring and no flaming drip, thus indicating a high degree of flame retardancy.

The above formulations which contained borates were found to be self-extinguishing with good char formation and no burning drips when positioned vertically and ignited at the bottom. The above formulation containing zinc phosphate burned to the clamp.

Further examples are provided below, indicating the versatility of phospham as a flame retardant for a wide group of plastics with high processing temperatures.

An acrylonitrile-butadiene-styrene copolymer with a relatively high processing temperature, Ronfalin MVH72®, a product of DSM, the Netherlands, is mixed with phospham in a weight ratio of 100:2 and injection molded in test bars at a melt temperature of 275° C. The flame retardancy as expressed by the LOI value would be increased appreciably.

To 100 parts by weight Ronfaloy C®, an ABS/polycarbonate alloy produced by DSM, the Netherlands, 1.8 parts of phospham are admixed and fed into an injection moulding machine to produce test bars. The temperature of the molding machine is set at 260° C. which results in a melt temperature of 270°–280° C. The mold temperature is 80° C. The flame retardancy would be increased considerably even with this small amount of phospham.

Dripping is suppressed by adding 6 parts by weight Siltex 32. If 8 parts novolak are also added, a voluminous char would be generated if the test bar is ignited.

If a high viscosity homopolymer such as polypropylene which is a typical polyolefin (Stamylan P 14M10®, product of DSM, the Netherlands) is admixed with phospham in the weight ratio of 100:3 and is injection molded into test bars at a melt temperature of 250° C. and mold temperature of 20° C., the test bars would show excellent flame retardancy with a correspondingly increased LOI value. Also in this example, further addition of a silica and a novolak would result in drip suppression and char formation respectively.

While only a few exemplary embodiments of this invention have been described in detail, those skilled in the art will recognize that there are many possible variations and modifications which may be made in the exemplary embodiments while yet retaining many of the novel and advantageous features of this invention. Accordingly, it is intended that the following claims cover all such modifications and variations.

What is claimed is:

1. A flame retardant thermoplastic composition comprising a flame retardant amount of phospham.

2. The composition of claim 1 in which the thermoplastic has a processing temperature of above 200° C.

3. The composition of claim 1 in which the thermoplastic comprises one or more polymers selected from the group consisting of styrene-containing copolymers, polyolefins and polyamides.

4. A flame retardant thermoplastic composition comprising a thermoplastic polyamide and a flame retardant amount of phospham.

5. The composition of claim 4, wherein said polyamide is nylon 4.6.

6. The composition of claim 1, wherein said flame retardant amount of phospham is from 0.1% to 25% by weight.

7. The composition of claim 1, wherein said flame retardant amount of phospham is from 0.2% to 15% by weight.

8. The composition of claim 1, wherein said composition further comprises a drip retardant.

9. The composition of claim 8, wherein said drip retardant is a silica-containing mineral.

10. The composition of claim 9, wherein said drip retardant is silica.

11. The composition of claim 1, wherein said composition further comprises a char enchancing additive.

12. The composition of claim 11, wherein said char enhancing additive is a novolak resin.

13. The composition of claim 11, wherein said char enhancing additive comprises an effective amount of at least one boron additive selected from the group consisting of boron oxide, the borates of metals having non-basic oxides, melamine borate, and condensation products of boron oxide or boric acid with novolaks.

14. The composition of claim 13 wherein said char enhancing additive further comprises an effective amount of novolak.

15. The composition of claim 13 wherein said boron additive is zinc borate.

16. A flame retardant thermoplastic composition comprising a thermoplastic styrene-containing copolymer and a flame retardant amount of phospham.

17. A flame retardant thermoplastic composition comprising a thermoplastic polyolefin and a flame retardant amount of phospham.

18. A process for the production of a flame retardant thermoplastic which comprises admixing said thermoplastic with a flame retardant amount of phospham.

* * * * *